Patented July 9, 1935

2,007,789

UNITED STATES PATENT OFFICE 2,007,789

PREPARATION OF CELLULOSE NITRO-ACETATES

Henri L. Barthélemy, Edward E. Huffman, and Walter B. Sellars, Rome, Ga., assignors to Tubize Chatillon Corporation, New York, N. Y., a corporation of Delaware No Drawing. Application December 2, 1933, Serial No. 700,748

9 Claims. (Cl. 260—101)

This invention relates to the preparation of cellulose nitro-acetates, and particularly to a method of simultaneously acetylating and partially denitrating nitrocellulose.

Various methods have been suggested for the preparation of cellulose nitro-acetates, but no commercially practicable method whereby the reactions can be directed and controlled successfully has been available heretofore.

It is the object of the invention to provide a simple and effective procedure for partially denitrating and acetylating nitrocellulose wherein the equilibrium is displaced in the desired direction to facilitate the separation of the nitro radical. The process is particularly applicable for acetylating and partially denitrating nitrocellulose containing from 10 to 14.3% of combined nitrogen.

Other objects and advantages of the invention will be apparent from the following detailed explanation.

To accomplish the purpose of the invention, we dissolve nitrocellulose in acetic acid of suitable strength, preferably glacial, and add to the solution a suitable acid catalyst. Sulphuric acid is preferred, but other inorganic acids such as hydrochloric, nitric, phosphoric, phosphorous, hypophosphorous and perchloric acids may be used.

To control and direct the reaction, we employ sulphur dioxide which is introduced in the required proportion to the solution of cellulose nitrate in acetic acid, preferably before the addition of the acid catalyst thereto. When the mixture is permitted to stand under suitable temperature conditions, clouds of brown gases are given off and the reaction proceeds in the desired direction.

The temperature may vary over a wide range, and determines the speed of the reaction. For example, at 55° C. the reaction may be complete in about thirty minutes, whereas at a temperature below 20° C. the reaction may require five to seven days. Consequently, by varying the temperature the reaction can be controlled as desired.

We have also found it desirable to regulate the reaction by the addition of a suitable buffer to eliminate and to prevent accumulation of acid in the solution. For this purpose urea is a suitable agent, but various other materials such as ammonium chloride, sodium acetate and sodium phosphate have been used successfully for the purpose indicated.

We do not wish to be restricted to any particular explanation of the mechanism of the reactions involved, but believe that they may be represented by the following formulae, in which R represents cellulose:

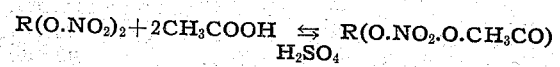

The function of the sulphur dioxide may be represented thus:

$$2HNO_3 + 3SO_2 = H_2SO_4 + 2SO_3 + 2NO$$

If a buffer such as urea is employed, it may react as follows to eliminate acids formed during the reaction:

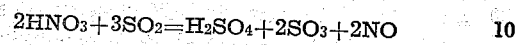

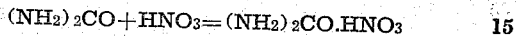

When the reaction is completed, it is necessary to precipitate the resulting nitro-acetate. This may be accomplished by pouring the solution into an equal volume of water or other suitable agent in which the cellulose nitro-acetate is substantially insoluble. Other precipitating media which have been used successfully include isopropyl ether and petroleum ether. The white precipitate which results from the dilution of the solution with one or the other of the precipitating media mentioned may be washed and dried. The product is soluble in acetone. The yield based on the weight of nitrocellulose used may vary from 75 to 100%. The composition may vary. The product usually contains from 28 to 40% of combined acetic acid and from 1.8 to 4% of nitrogen. These compositions are, however, merely illustrative of the results obtainable, and the composition can be varied by regulating the reaction.

The following examples will serve to illustrate further the practice of the invention and the desirable results obtainable thereby:

Example 1

15 grams of dry nitro-cellulose (11.2% N— dried below 2% moisture in sulphuric acid desiccator) was dissolved in 285 grams of glacial acetic acid (99.5%). After a clear syrupy mixture was obtained 2 grams of sulphur dioxide was slowly bubbled in with continuous stirring. One-half to one and a half cubic centimeters of 95% sulphuric acid was mixed in 20 cc of glacial acetic acid and this mixture added to the syrupy collodion. The whole container was placed in a water bath at 55° C. for 30 minutes when clouds of brown gases were given off. At this point it was slowly cooled to 30° C. and left to set for one hour. It was then poured into an equal volume of water. The fine white precipitate was washed free of acid, dried in an oven at 95° centigrade. The resulting product was a fine white amorphous-like material soluble in acetone, and analysis showed 4% nitrogen combined and 28 to 30% acetic acid combined.

*Example 2*

30 grams of dry nitro-cotton (11.2% N and less than 2% moisture) was dissolved in 270 grams of glacial acetic acid (99.5%) and thoroughly mixed to a thick viscous collodion. Four grams of sulphur dioxide and one or two cubic centimeters of 95% sulphuric acid were mixed into 35 cc of glacial acetic acid and this mixture added slowly and worked into the thick collodion. The container was placed in a water bath at 55° C. After 20 to 30 minutes time, clouds of brown gases were evolved. It was slowly cooled to 40° centigrade for 30 minutes more and during this time four grams of urea dissolved in 35 cc of warm glacial acetic acid was slowly added a few centimeters at a time while stirring. It was allowed to set at room temperature for one hour and then poured into an equal volume of water. The white product was washed free of acid, dried in an oven at 95° centigrade. Analysis of the resulting cellulose nitro-acetate showed 3 to 4% nitrogen combined and 35 to 30% combined acetic acid. Yield of product based on weight of nitro-cellulose used was 75 to 80%. The product was soluble in acetone.

*Example 3*

Carried out the same as Example No. 2 at a temperature below 20° centigrade for a period of 5 to 7 days and correspondingly lengthened the time of addition of acetic acid urea solution. The resulting product contained 1.8 to 2% combined nitrogen and 40 to 38% combined acetic acid.

*Example 4*

Carried out the same as Example No. 1 or 2, except precipitated and washed in isopropyl ether and the yield was 95 to 100%.

*Example 5*

Carried out the same as Example No. 1 or 2, except precipitated and washed in petroleum ether and the yield was 95 to 100%.

*Example 6*

Carried out the same as Example No. 1, or 2, or 3, or 4, or 5, except dry nitro-cotton of 14.3% nitrogen combined was used as starting material.

From the foregoing description, it will be observed that the essential improvement in the procedure for the preparation of cellulose nitro-acetates involves the introduction of sulphur dioxide for the purpose of directing the reaction, and that a further improvement is effected by the use of a buffer such as urea or an equivalent thereof.

While sulphuric acid is preferred as a catalyst for the reaction, any of the other acids mentioned and other inorganic acids may be employed for the purpose of the invention.

Various changes may be made in the details of the procedure as well as in the reagents employed, without departing from the invention or sacrificing any of the advantages thereof.

We claim:

1. The method of partially denitrating and acetylating nitro-cellulose which comprises adding an inorganic acid catalyst and sulphur dioxide to a solution of the nitro-cellulose in glacial acetic acid.

2. The method of partially denitrating and acetylating nitro-cellulose which comprises adding an inorganic acid catalyst, sulphur dioxide and a buffer capable of eliminating acid to a solution of the nitro-cellulose in glacial acetic acid.

3. The method of partially denitrating and acetylating nitro-cellulose which comprises adding an inorganic acid catalyst and sulphur dioxide to a solution of the nitro-cellulose in glacial acetic acid, and thereafter precipitating the partially denitrated nitro-cellulose by adding to the solution a liquid in which the partially denitrated nitro-cellulose is substantially insoluble.

4. The method of partially denitrating and acetylating nitro-cellulose which comprises adding an inorganic acid catalyst, sulphur dioxide and a buffer capable of eliminating acid to a solution of the nitrocellulose in glacial acetic acid, the amount of inorganic acid catalyst employed being relatively small as compared with the amount of sulphur dioxide employed, and then precipitating the partially denitrated nitro-cellulose by adding to the solution a liquid in which the partially denitrated nitro-cellulose is substantially insoluble.

5. The method of partially denitrating and acetylating nitro-cellulose which comprises adding an inorganic acid catalyst, sulphur dioxide and a buffer capable of eliminating acid selected from the group consisting of urea, ammonium chloride, sodium acetate and sodium phosphate to a solution of the nitro-cellulose in glacial acetic acid.

6. The method of partially denitrating and acetylating nitro-cellulose which comprises adding an inorganic acid catalyst, sulphur dioxide and a buffer capable of eliminating acid selected from the group consisting of urea, ammonium chloride, sodium acetate and sodium phosphate to a solution of the nitro-cellulose in glacial acetic acid, and then precipitating the partially denitrated nitro-cellulose by adding to the solution a liquid in which the partially denitrated nitro-cellulose is substantially insoluble.

7. The method of partially denitrating and acetylating nitro-cellulose containing from 10 to 14.3% of combined nitrogen which comprises adding sulphuric acid, sulphur dioxide and a buffer capable of eliminating acid to a solution of the nitro-cellulose in glacial acetic acid, the amount of sulphuric acid employed being relatively small as compared with the amount of sulphur dioxide employed, and then precipitating the partially denitrated nitro-cellulose by adding to the solution a liquid in which the partially denitrated nitro-cellulose is substantially insoluble.

8. The method of partially denitrating and acetylating nitro-cellulose containing from 10 to 14.3% of combined nitrogen which comprises adding sulphuric acid, sulphur dioxide and a buffer selected from the group consisting of urea, ammonium chloride, sodium acetate and sodium phosphate to a solution of the nitro-cellulose in glacial acetic acid and then precipitating the partially denitrated nitro-cellulose by adding to the solution in which the resulting partially denitrated nitro-cellulose is substantially insoluble.

9. The method of partially denitrating and acetylating nitro-cellulose containing from 10 to 14.3% of combined nitrogen which comprises adding sulphuric acid, sulphur dioxide and a buffer selected from the group consisting of urea, ammonium chloride, sodium acetate, and sodium phosphate to a solution of the nitro-cellulose in glacial acetic acid and then precipitating the resulting partially denitrating nitro-cellulose by adding to the solution an agent selected from the group consisting of water, isopropyl-ether and petroleum ether.

HENRI L. BARTHÉLEMY.
EDWARD E. HUFFMAN.
WALTER B. SELLARS.

Certificate of Correction

July 9, 1935.

Patent No. 2,007,789. HENRI L. BARTHÉLEMY ET AL.

It is hereby certified that error appears in the printed specification of the above numbered patent requiring correction as follows: Page 1, second column, line 5, strike out the formula and insert instead—

$$R(O.NO_2)_2 + CH_3COOH \underset{H_2SO_4}{\leftrightarrows} R(O.NO_2.O.CH_3CO) + HNO_3;$$

and that the said Letters Patent should be read with this correction therein that the same may conform to the record of the case in the Patent Office.

Signed and sealed this 10th day of September, A. D. 1935.

[SEAL]

LESLIE FRAZER,
*Acting Commissioner of Patents.*